United States Patent
Arlitt et al.

(10) Patent No.: US 8,683,479 B1
(45) Date of Patent: Mar. 25, 2014

(54) SHIFTING INFORMATION TECHNOLOGY WORKLOAD DEMANDS

(75) Inventors: Martin Arlitt, Calgary (CA); Thomas W. Christian, Fort Collins, CO (US); Daniel Juergen Gmach, Palo ALto, CA (US); Chris D. Hyser, Victor, NY (US); Jerome Rolia, Kanata (CA); Manish Marwah, Palo Alto, CA (US); Amip J Shah, Santa Clara, CA (US); Cullen E. Bash, Los Gatos, CA (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 13/028,974

(22) Filed: Feb. 16, 2011

(51) Int. Cl.
  *G06F 9/46* (2006.01)
  *G06F 15/173* (2006.01)
(52) U.S. Cl.
  USPC ........... 718/104; 718/105; 709/223; 709/224; 709/225; 709/226
(58) Field of Classification Search
  None
  See application file for complete search history.

(56) References Cited

U.S. PATENT DOCUMENTS

| | | | |
|---|---|---|---|
| 5,247,677 A * | 9/1993 | Welland et al. | 718/103 |
| 5,301,324 A * | 4/1994 | Dewey et al. | 718/105 |
| 6,704,763 B1 * | 3/2004 | Gulick | 718/100 |
| 7,135,956 B2 | 11/2006 | Bartone et al. | |
| 7,302,450 B2 * | 11/2007 | Benedetti et al. | 1/1 |
| 7,590,472 B2 | 9/2009 | Hakim et al. | |
| 7,644,051 B1 | 1/2010 | Moore et al. | |
| 7,653,443 B2 * | 1/2010 | Flohr | 700/14 |
| 7,783,390 B2 | 8/2010 | Miller | |
| 2006/0106938 A1 * | 5/2006 | Dini et al. | 709/228 |
| 2006/0259621 A1 * | 11/2006 | Ranganathan et al. | 709/226 |
| 2008/0005744 A1 * | 1/2008 | Buco et al. | 718/105 |
| 2008/0221941 A1 * | 9/2008 | Cherkasova et al. | 705/7 |
| 2008/0222640 A1 * | 9/2008 | Daly et al. | 718/103 |
| 2009/0055829 A1 * | 2/2009 | Gibson | 718/103 |
| 2009/0228726 A1 | 9/2009 | Malik et al. | |
| 2009/0282411 A1 * | 11/2009 | Carteri et al. | 718/102 |
| 2010/0004790 A1 * | 1/2010 | Harbin et al. | 700/291 |
| 2010/0138837 A1 * | 6/2010 | Olsson et al. | 718/102 |
| 2010/0313203 A1 * | 12/2010 | Dawson et al. | 718/102 |
| 2011/0126206 A1 * | 5/2011 | Kato et al. | 718/103 |
| 2012/0137002 A1 * | 5/2012 | Ferris et al. | 709/226 |
| 2012/0166005 A1 * | 6/2012 | Mayhew | 700/295 |

OTHER PUBLICATIONS

Heller et al., "ElasticTree: Saving Energy in a Data Center Networks," accessed at https://www.usenix.org/events/nsdi10/tech/full_papers/heller.pdf on Dec. 7, 2010 (16 pages).

* cited by examiner

*Primary Examiner* — Emerson Puente
*Assistant Examiner* — Adam Lee

(57) ABSTRACT

Methods, apparatus and articles of manufacture to shift information technology workload demands are disclosed. An example method disclosed herein comprises obtaining demand profiles for workloads in an information technology infrastructure, each demand profile representing resource utilization over time to support a respective workload, and evaluating the demand profiles to shift, in time, assignment of at least one of the workloads to resources of the information technology infrastructure based on a target demand profile for an aggregation of the workloads.

14 Claims, 10 Drawing Sheets

SHIFTING INFORMATION TECHNOLOGY WORKLOAD DEMANDS

BACKGROUND

In the context of information technology, capacity planning involves mapping application workloads to information technology resources to ensure that there are sufficient resources to meet workload demands. Server consolidation tools also map workloads to resources (e.g., servers), but with the goal of reducing the amount of resources (e.g., number of servers) to be used to satisfy the workload demands. Some capacity planning and server consolidation tools employ demand profiles that represent the resources utilized over time to support the application workloads. Such existing tools generally consider the demand profiles to be fixed and endeavor to map the fixed demand profiles to the available information technology resources.

DETAILED DESCRIPTION

Figure 1:
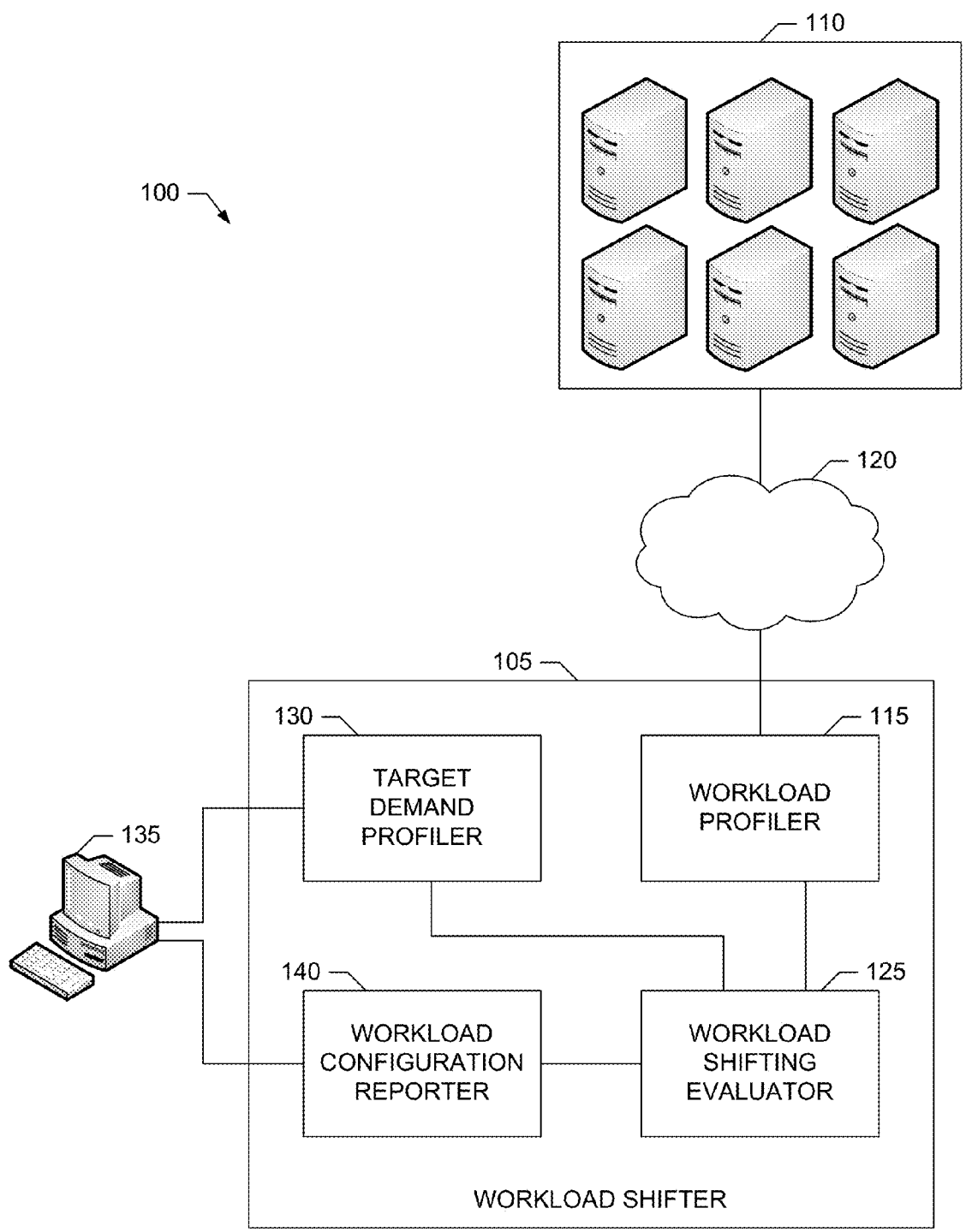
FIG. 1 is block diagram of an example workload shifter for use in shifting workload demands in an example information technology infrastructure.

Methods, apparatus and articles of manufacture to shift information technology workload demands are disclosed herein. As noted above, existing capacity planning and server consolidation tools that employ workload demand profiles generally consider the demand profiles to be fixed and work to map the fixed demand profiles to available information technology (IT) resources. However, in many cases, workload demand is not necessarily fixed and, instead, can be varied in time while still meeting an organization's needs. For example, an organization's application workloads can include time-critical workloads (e.g., such as workloads supporting interactive applications) and also delay-tolerant workloads (e.g., such as workloads supporting batch jobs). Although performance of the time-critical workloads may be relatively fixed in time, performance of the delay-tolerant workloads may be able to be shifted in time. Existing capacity planning and server consolidation tools generally do not consider shifting workload demands in time as being an option when mapping workload demands to IT resources.

Additionally, existing capacity planning and server consolidation tools generally have a limited view as to what constitutes an IT resource. For example, existing capacity planning and server consolidation tools may consider IT components (e.g., such as servers, network switches, storage units, etc.), as well as their attributes (e.g., such as central processing unit (CPU) attributes, memory attributes, input/output (IO) attributes, network bandwidth attributes, etc.) as IT resources to which workloads can be mapped. However, existing capacity planning and server consolidation tools generally do not consider other resources affecting an IT infrastructure, such as supply power demand and associated energy costs (e.g., which may vary based on time-of-day and/or in accordance with variations in overall power usage), availability of renewable energy sources, natural resources (e.g., such as water for cooling), chillers and computer room air conditioners (CRACs), etc., when determining workload mappings. These latter resources, and other resources related to economic and ecological sustainability, are coming under increased scrutiny given ongoing concerns regarding global climate change, as well as more recent concerns regarding global economic stability.

The example methods, apparatus and articles of manufacture to shift IT workload demands disclosed herein do not treat workload demands as fixed and, instead, permit workload shifting in time when determining possible assignments of workloads to IT resources. Additionally, the example methods, apparatus and articles of manufacture disclosed herein permit consideration of many types of IT resources, including energy source type/cost and other resources, such as those mentioned above, that affect economic and ecological sustainability, in addition to the more traditional types of IT resources, such as the IT component and attribute resources mentioned above, when determining possible assignments of workloads to IT resources. As such, an example method disclosed herein to shift IT workloads includes obtaining demand profiles for workloads in an IT infrastructure. As described above, a demand profile can represent resource utilization over time to support a respective workload. In some examples, the demand profile for a respective workload can be determined based on (e.g., by aggregating) data representing IT resource utilization at different times to support the workloads. The example method also includes evaluating the demand profiles to shift, in time, assignment of one or more of the workloads to resources of the IT infrastructure based on a target demand profile for an aggregation of the workloads.

An example of evaluating the workload demand profiles to shift workload assignments can include determining a possible workload assignment configuration for assigning the workloads to the IT resources in which one or more of the workloads are shifted in time. Such an example evaluation can include aggregating the demand profiles shifted in time in accordance with the possible workload assignment configuration to determine an aggregate workload demand profile. The aggregate workload demand profile is then compared with the target demand profile to determine whether the possible workload assignment configuration satisfies the target demand profile, or is otherwise valid. Example target demand profiles include, but are not limited to, profiles that: (i) track a cost, over time, of energy resources to power the IT infrastructure, (ii) track availability of renewable energy resources to power the IT infrastructure, (iii) reduce an amount of resources to be employed by the IT infrastructure by increasing a duration during which the resources of the IT infrastructure are utilized to support the workloads, etc.

In some examples, shifting one or more of the workloads to determine a possible workload assignment configuration involves shifting, in time, assignment of delay-tolerant workloads, but not time-critical workloads, to the IT resources. For example, time-critical workloads can be assigned to the resources before assigning the delay-tolerant workloads, shifted in time, to the resources. Also, in some examples, shifting of the delay-tolerant workloads is performed using a stochastic process (and associated algorithms) for selecting the delay-tolerant workloads to be shifted. As such, the stochastic process (and associated algorithms) can be repeated to determine different possible workload assignment configurations for the same workloads and resources. Additionally, a workload prioritization can be determined from workload assignment constraints (e.g., corresponding to workload ordering/sequencing constraints, mission critical rankings of the workloads, etc.), and workloads can be shifted, in time, in accordance with this workload prioritization.

Furthermore, the example methods, apparatus and articles of manufacture to shift IT workload demands disclosed herein permit systematic and repeated evaluation and reassignment of workloads executing on an IT infrastructure. In contrast, existing capacity planning and server consolidation tools generally operate infrequently, possibly only once after a decision has been made to migrate or consolidate a given set of workloads to a given set of IT resources. Unlike these existing tools, the example methods, apparatus and articles of manufacture disclosed herein support repeated (e.g., continuous, scheduled, etc.) monitoring and analyzing of IT workloads to enable reassignment/rescheduling of workloads in time to improve utilization of IT resources, reduce the environmental footprint (e.g., emissions, natural resource usage, etc.) of the IT infrastructure, reduce total cost of operation (TCO), defer equipment upgrades, etc.

Turning to the figures, a block diagram of an example system 100 that includes an example workload shifter 105 for use in shifting workload demands in an example IT infrastructure 110 is illustrated in FIG. 1. The IT infrastructure 110 of the illustrated example can correspond to, for example, one or more data centers, computing sites, racks of computing equipment, computers, servers, etc., and/or other types of processing elements, or combinations thereof, capable of supporting one or more application workloads. Additionally or alternatively, the IT infrastructure 110 can include logical representations of one or more of the aforementioned example physical devices/systems. For example, the IT infrastructure 110 could include one or more logical, or virtual, servers deployed across or otherwise combining multiple physical servers. The application workloads supported by the IT infrastructure 110 can correspond to any type or number of applications (e.g., or processes, functions, procedures, etc.) executed or otherwise provided by the IT infrastructure 110. As described above, the IT infrastructure has resources to support the application workloads. These resources can correspond to any type of resource used to support the application workloads, including IT components (e.g., such as servers, network switches, storage units, etc.), and their attributes (e.g., such as CPU attributes, memory attributes, IO attributes, network bandwidth attributes, etc.), as well as other resources, such as resources related to economic and/or ecological sustainability. Examples of the latter types of resources include, but are not limited to, amount/cost of the energy resources to power the IT infrastructure 110, availability of renewable energy sources, natural resources (e.g., water) consumed by the IT infrastructure 110, etc.

The workload shifter 105 of the illustrated example performs shifting, in time, of application workloads supported by the IT infrastructure 110 in accordance with the example methods, apparatus and/or articles of manufacture described herein. At a high-level, the workload shifter 105 employs load shifting, in time, to reshape the overall, or aggregate, workload demand profile for the application workloads to be supported by the IT infrastructure 110. The workload shifter 105 of the illustrated example utilizes demand profiling of individual applications supported the IT infrastructure 110 to determine possible workload assignment configurations for assigning (e.g., rescheduling) application workloads, in time, to the resources of the IT infrastructure 110. Accordingly, the workload shifter 105 of FIG. 1 includes an example workload profiler 115 to determine demand profiles for the application workloads supported by the IT infrastructure 110.

Figure 2:
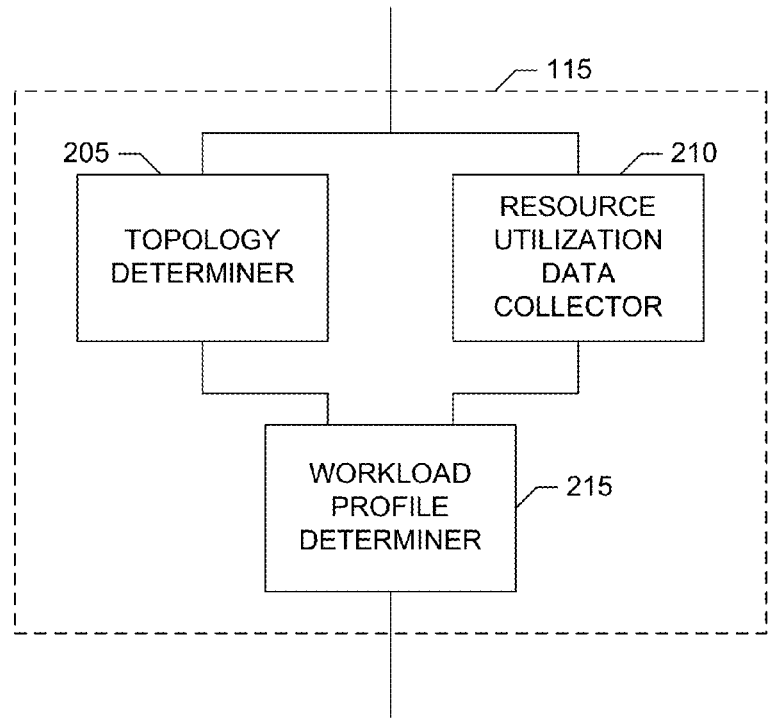
FIG. 2 is a block diagram of an example workload profiler that may be used to implement the example workload shifter of FIG. 1.

For example, for each workload corresponding to a respective application, the workload profiler 115 determines a demand profile representing resource utilization over time to support the respective workload. In some examples, the workload profiler 115 determines the demand profiles for the respective application workloads using data obtained from the IT infrastructure 110 via an example network 120. The network 120 can be implemented by any type of communication network, such as the Internet, one or more cabled or wireless communication networks, one or more public or private data communication networks, etc., or any combination thereof. An example implementation of the workload profiler 115 is illustrated in FIG. 2, which is described in greater detail below.

Figure 3:
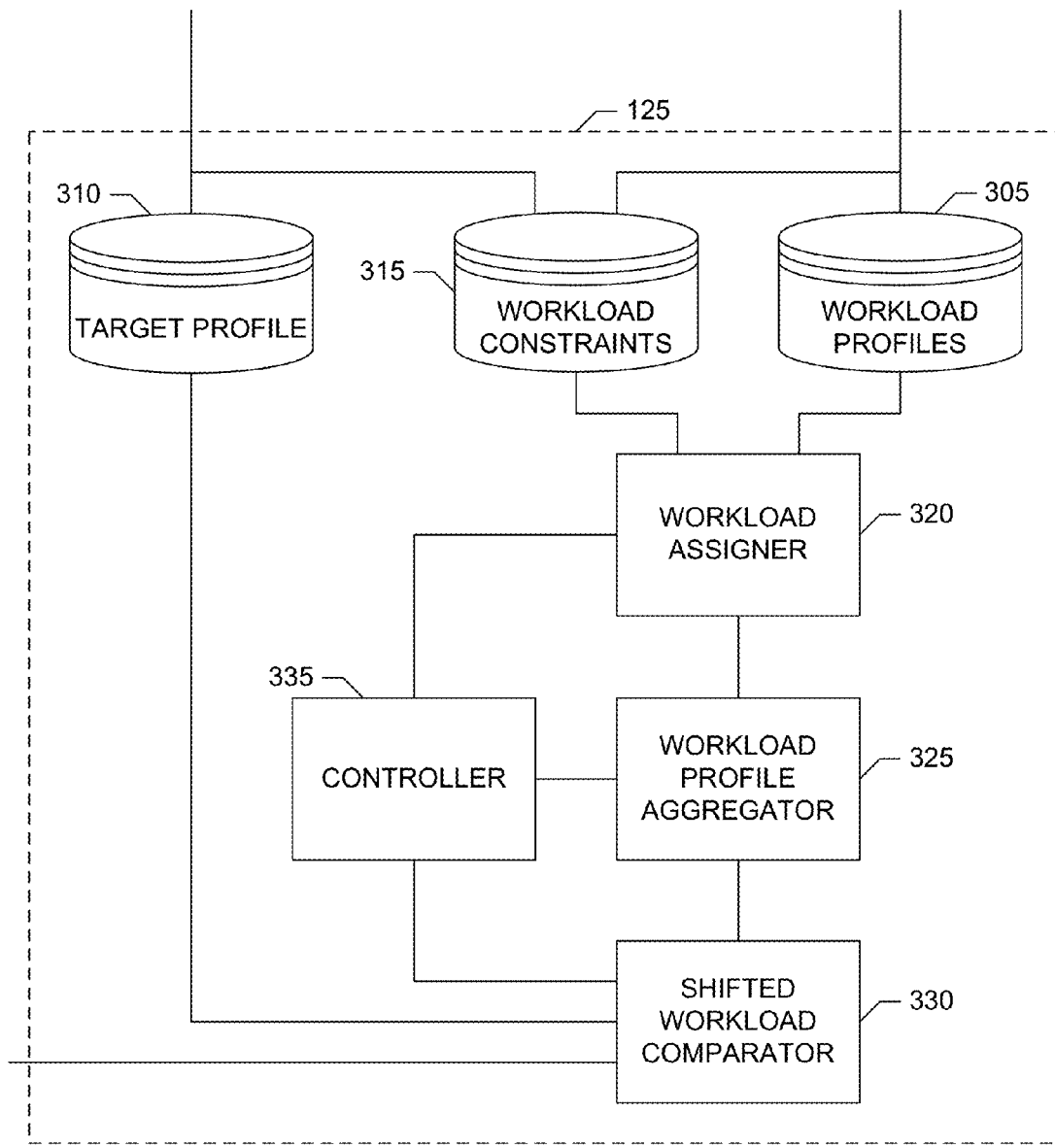
FIG. 3 is a block diagram of an example workload shifting evaluator that may be used to implement the example workload shifter of FIG. 1.

To evaluate the workload demand profiles obtained from the workload profiler 115 to determine possible workload assignment configurations for assigning application workloads in time to resources of the IT infrastructure 110, the workload shifter 105 of FIG. 1 includes an example workload shifting evaluator 125. In the illustrated example, the workload shifting evaluator 125 determines one or more possible workload assignment configuration(s) that involve shifting, in time, one or more of the application workloads. The workload shifting evaluator 125 shifts application workload(s) in time based on a target demand profile provided by an example target demand profiler 130. For example, the workload shifting evaluator 125 can determine an aggregate workload demand profile for a possible workload assignment configuration by aggregating the individual workload demand profiles after shifting these profiles in accordance with how the application workloads have been shifted to form the possible workload assignment configuration. The workload shifting evaluator 125 then evaluates this aggregate workload demand profile relative to the target demand profile provided by an example target demand profiler 130 to determine whether the possible workload assignment configuration is valid or otherwise meets the target demand profile. An example implementation of the workload shifting evaluator 125 is illustrated in FIG. 3, which is described in greater detail below.

The target demand profiler 130 of the illustrated example is able to obtain target demand profile(s) from, for example, a user (e.g., administrator, operator, owner, etc.) via an example terminal 135, and/or from one or more IT management tools (not shown), etc., or a combination thereof. The terminal 135 can be implemented by, for example, the processing system 1000 of FIG. 11 and/or any type of computer or computing device, such as a personal computer, a personal digital assistant (PDA), an Internet appliance, etc. The terminal 135 can be communicatively coupled locally with the workload shifter 105 or remotely via a network, such as the network 120 or a different network. In some examples, the terminal 135 is used to provide a target demand profile to the target demand profiler 130 in a machine-readable format. Additionally or alternatively, the target demand profiler 130 provides an interface by which a user of the terminal 135 can specify a target demand profile. Examples of target demand profiles that may be obtained by the target demand profiler 130 (e.g., from or via the terminal 135) include, but are not limited to, a profile that: (i) tracks a cost, over time, of energy resources to power the IT infrastructure, (ii) tracks availability of renewable energy resources to power the IT infrastructure, (iii) reduces an amount of resources to be employed by the IT infrastructure by increasing a duration during which the resources of the IT infrastructure are utilized to support the workloads, etc.

The workload shifter 105 of FIG. 1 further includes an example workload configuration reporter 140 to report the possible workload assignment configuration(s) determined by the workload shifting evaluator 125. For example, the workload shifting evaluator 125 can identify one or more possible workload assignment configurations that satisfy a particular target demand profile. The workload shifting evaluator 125 provides these possible workload assignment configuration(s) to the workload configuration reporter 140, which formats the identified workload assignment configuration(s) in a machine and/or human readable format and provides the identified workload assignment configuration(s) to the terminal 135 for subsequent processing. Such subsequent processing can include, for example, a user evaluating different possible workload assignment configurations and selecting one for use in reassigning the application workloads to the IT infrastructure 110. In some examples, the workload configuration reporter 140 can automatically use an identified workload assignment configuration to cause the application workloads to be reassigned to the IT infrastructure 110 using, for example, any automated application scheduling technique.

In some examples, the workload configuration reporter 140 reports the individual workload demand profiles determined by the workload profiler 115 in addition to the possible workload assignment configuration(s) determined by the workload shifting evaluator 125 to, for example, enable a user (e.g., administrator, operator, owner, etc.) to examine and evaluate various what-if scenarios for shaping the overall (e.g., aggregated) workload supported by the IT infrastructure 110. For example, an organization administrator or business owner could use the individual workload demand profiles to learn the cost and environmental footprint of running the applications in the IT infrastructure 110 under a current scheduling policy. The organization administrator or business owner could then use the possible workload assignment configuration(s) to compare ways in which, for example, delay-tolerant application workloads could be shifted in time to off-peak hours or when renewable energy sources (e.g., solar, wind, etc.) are available to defer expansion of the IT infrastructure 110 and/or reduce the operating costs, carbon footprint and/or greenhouse gas emissions (e.g., which may also reduce costs under regulatory schemes, such as carbon cap-and-trade schemes), etc., of the IT infrastructure 110. For example, the possible workload assignment configuration(s) provided by the workload shifter 105 can be used to determine shift(s) of delay-tolerant workloads that: (i) yield a more uniform overall (e.g., aggregate) workload demand, (ii) move demands to times of day when less cooling is required, and/or or when power is cheaper to help to reduce power costs, (iii) move demands to times at which power is likely to be more available (e.g., for data centers in developing countries where electricity is not constantly available, for data centers running on solar power, etc.).

In some examples, the workload shifter 105 enables repeated (e.g., such as periodic, continuous, etc.) analysis of updated application workload demands and determination of updated workload assignment configuration(s). For example, the workload profiler 115 can operate repeatedly (e.g., such as periodically, continuously, etc.) to determine updated workload demand profiles as application workloads are rescheduled in time in the IT infrastructure 110. The workload shifting evaluator 125 can then reevaluate these updated workload demand profiles to determine updated workload assignment configuration(s) involving re-shifting, in time, one or more of the application workloads. By repeatedly (e.g., such as periodically, continuously, etc.) analyzing workload data received from the IT infrastructure 110 via the network 120, the workload shifter 105 can be used to, for example, recommend adjustments to the mapping of applications to resources (e.g., servers, etc.) of the IT infrastructure 110 to use the resources more efficiently and/or in a more sustainable manner.

A block diagram of an example implementation of the workload profiler 115 of FIG. 1 is illustrated in FIG. 2. The example workload profiler 115 of FIG. 2 includes an example topology determiner 205 to obtain information describing the topology of the IT infrastructure 110. The topology information obtained by the topology determiner 205 can include, for example, descriptions of the resources (e.g., servers, memory, network bandwidth, power source(s), etc.) of the IT infrastructure 110 and, in particular, those resources currently being used to support the application workloads.

The workload profiler 115 of the illustrated example also includes an example resource utilization data collector 210 to collect resource utilization data for the application workloads supported by the IT infrastructure 110. For example, the resource utilization data collector 210 can poll or otherwise query particular resources of the IT infrastructure 110 (or one or more other IT infrastructures if, for example, the applications are being migrated or consolidated to the IT infrastructure 110) to obtain data representing resource utilization at different sample times to support each of the application workloads in the IT infrastructure 110. An example workload profile determiner 215 included in the workload profiler 115 of FIG. 2 then processes the resource utilization data obtained by the resource utilization data collector 210 to determine individual workload demand profiles for the respective application workloads to be supported by the IT infrastructure 110. For example, the workload profile determiner 215 can aggregate the resource utilization data over time along one or more specified metrics related to resource demands of the IT infrastructure 110. Examples of such metrics include, but are not limited to, power consumption, server usage, memory usage, network bandwidth usage, etc., over time used to support a particular application workload.

A block diagram of an example implementation of the workload shifting evaluator 125 of FIG. 1 is illustrated in FIG. 3. The example workload shifting evaluator 125 of FIG. 3 includes an example workload profile storage 305 to store the individual workload demand profiles determined by the workload profiler 115. The workload shifting evaluator 125 also includes an example target profile storage 310 to store the target demand profile(s) obtained by the target demand profiler 130. The workload shifting evaluator 125 of the illustrated example further includes an example workload constraint storage 315 to store one or more workload constraints governing assignment of the application workloads to the IT infrastructure 110. Examples of workload constraints include, but are not limited to, workload ordering/sequencing constraints, mission critical rankings of the workloads, etc. The workload constraints can be specified or otherwise obtained from a user of the terminal 135 (e.g., via the target demand profiler 130) and/or from data obtained from the IT infrastructure 110 (e.g., via the workload profiler 115 and network 120). The storages 305, 310 and/or 315 can be implemented using any type of memory or storage device, or combination thereof, such as the example volatile memory 1018 and/or the example mass storage device 1030 of the example processing system 1000 of FIG. 11, which is described in greater detail below.

Figure 4:
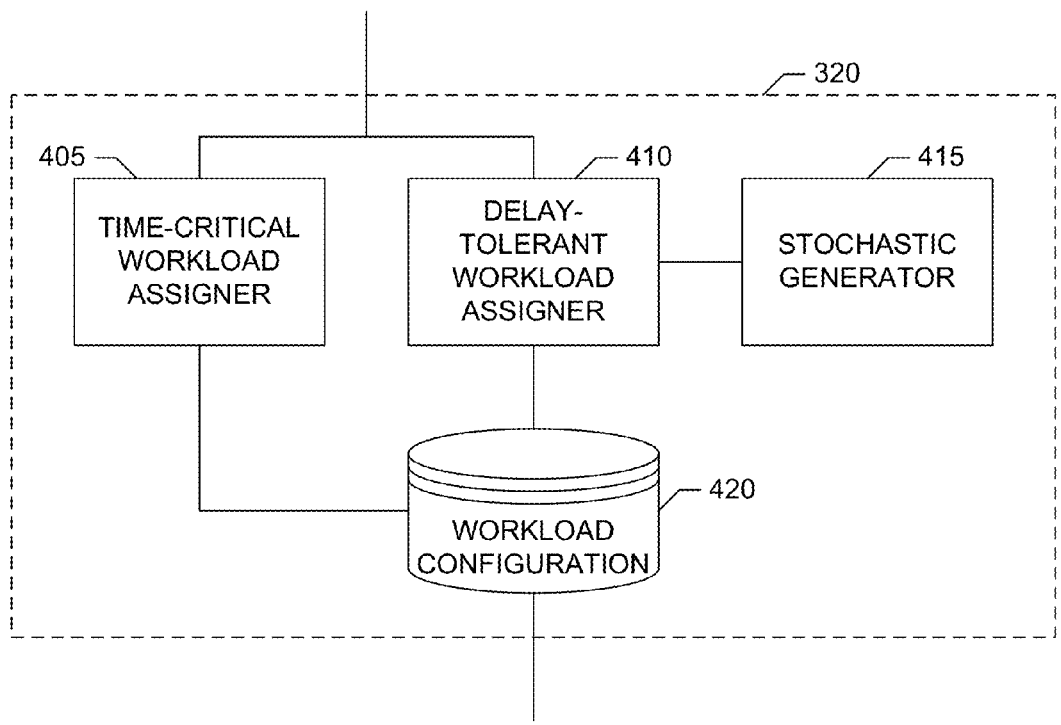
FIG. 4 is a block diagram of an example workload assigner that may be used to implement the example workload shifting evaluator of FIG. 3.

To determine possible workload assignment configurations involving shifts, in time, of application workloads, the workload shifting evaluator 125 of FIG. 3 includes an example workload assigner 320, an example workload profile aggregator 325 and an example shifted workload comparator 330. In the illustrated example, the workload assigner 320 is to determine possible workload assignment configuration(s) for assigning the application workloads to the resources of the IT infrastructure. A possible workload assignment configuration determined by the workload assigner 320 includes shifting, in time, one or more of the application workloads based on the workload constraint(s) stored in the workload constraint storage 315 and/or the workload demand profile(s) stored in the workload profile storage 305. An example implementation of the workload assigner 320 is illustrated in FIG. 4, which is described in greater detail below.

The workload profile aggregator 325 included in the workload shifting evaluator 125 of FIG. 3 determines an aggregate workload demand profile for a possible workload assignment configuration determined by the workload assigner 320. In the illustrated example, the workload profile aggregator 325 aggregates the individual workload demand profile(s) stored in the workload profile storage 305 in accordance with how the possible workload assignment configuration shifts, in time, one or more of the application workloads. For example, the workload profile aggregator 325 can retrieve the individual workload demand profile(s) from the workload profile storage 305. Next, the workload profile aggregator 325 can shift those individual workload demand profile(s) corresponding to application workloads that have been shifted in the possible workload assignment configuration, where the amount by which a particular individual workload demand profile is shifted corresponds to the amount of time by which the respective application workload has been shifted in the possible workload assignment configuration. Then, the workload profile aggregator 325 combines (e.g., sums) the individual workload demand profile(s), after any shifting, to determine the aggregate workload demand profile for the possible workload assignment configuration.

The shifted workload comparator 330 included in the workload shifting evaluator 125 of FIG. 3 compares an aggregate workload demand profile determined by the workload profile aggregator 325 with a target demand profile stored in the target profile storage 310. For example, the shifted workload comparator 330 can evaluate any type of cost metric, distance metric, error metric, etc., to compare the aggregate workload demand profile with the target demand profile. In such examples, the resulting metric value can be compared to a threshold or other criteria to determine whether the aggregate workload demand profile is sufficiently similar to the target demand profile to indicate that the possible workload assignment configuration corresponding to the aggregate workload demand profile is valid (e.g., or, in other words, meets or satisfies the target demand profile). Additionally or alternatively, in some examples the shifted workload comparator 330 provides (e.g., presents) the aggregate workload demand profile and the target demand profile to a user (e.g., via the terminal 135) to enable subjective comparison of the aggregate workload demand profile and the target demand profile.

The workload shifting evaluator 125 of FIG. 3 of the illustrated example also includes an example controller 335 to control operation of, for example, one or more of the workload assigner 320, the workload profile aggregator 325 and/or the shifted workload comparator 330. In some examples, the workload assigner 320 employs stochastic (e.g., random number based) algorithms that may result in the workload assigner 320 determining a different workload assignment configuration for the same workload constraint(s) and individual workload profiles each time the workload assigner 320 is invoked. In such examples, the controller 335 can invoke the workload assigner 320, the workload profile aggregator 325 and the shifted workload comparator 330 multiple times to determine different possible workload assignment configurations for the same workload constraint(s) and individual workload profiles. Additionally or alternatively, the controller 335 can invoke the workload assigner 320, the workload profile aggregator 325 and the shifted workload comparator 330 when updated workload constraint(s) and/or individual workload profiles are received by the workload shifting evaluator 125 to cause the possible workload assignment configuration(s) to be updated.

A block diagram of an example implementation of the workload assigner 320 of FIG. 3 is illustrated in FIG. 4. The example workload assigner 320 of FIG. 4 includes an example time-critical workload assigner 405 to assign time-critical application workload(s) to a possible workload assignment configuration. Generally, an application workload is considered to be time-critical if the application workload should not be shifted in time. Interactive applications, mission-critical applications, etc., are examples of applications that can yield time-critical workloads. Accordingly, in the illustrated example, the time-critical workload assigner 405 assigns time-critical application workload(s) to particular execution times (and possibly particular resources based on, for example, a workload prioritization determined from one or more workload constraints, the topology information obtained by the workload profiler 115, etc.) in a possible workload assignment configuration.

The workload assigner 320 of FIG. 4 also includes an example delay-tolerant workload assigner 410 to assign delay-tolerant application workload(s) to a possible workload assignment configuration. Generally, an application workload is considered to be delay-tolerant if the application workload can be shifted in time with little or no impact on the corresponding application. Batch jobs, non-interactive applications, etc., are examples of applications that can yield delay-tolerant application workloads. Accordingly, in the illustrated example, the delay-tolerant workload assigner 410 can shift, in time, delay-tolerant application workload(s) prior to assigning these workloads to resources (and possibly particular resources based on, for example, a workload prioritization determined from one or more workload constraints, the topology information obtained by the workload profiler 115, etc.) in a possible workload assignment configuration.

In some examples, the time-critical workload assigner 405 operates to assign the time-critical application workloads to a possible workload assignment configuration before the delay-tolerant workload assigner 410 assigns the delay-tolerant application workloads to the possible workload assignment configuration. This helps ensure that the time-critical application workloads can be assigned to appropriate execution times (and, possibly, appropriate resources) in the possible workload assignment configuration. Additionally or alternatively, the time-critical workload assigner 405 and/or the delay-tolerant workload assigner 410 can use a workload prioritization order determined from the workload constraint(s) described above to select respective time-critical and/or delay-tolerant workloads for assignment to a possible workload assignment configuration.

In the illustrated example, the delay-tolerant workload assigner 410 employs one or more stochastic algorithms to select the delay-tolerant application workloads to be included (with possible shifting in time) in a possible workload assignment configuration. For example, the delay-tolerant workload assigner 410 can employ a greedy, genetic, heuristic or other stochastic algorithm to determine how delay-tolerant workloads are selected and shifted for inclusion in a possible workload assignment configuration. Accordingly, the workload assigner 320 of FIG. 4 includes an example stochastic generator 415 to drive the stochastic algorithm(s) employed by the delay-tolerant workload assigner 410. For example, the stochastic generator 415 can correspond to any type of random or pseudo-random number generator.

The workload assigner 320 of the illustrated example further includes an example workload configuration storage 420 to store the possible workload assignment configurations determined by the time-critical workload assigner 405 and the delay-tolerant workload assigner 410. The storage 420 can be implemented using any type of memory or storage device, or combination thereof, such as the example volatile memory 1018 and/or the example mass storage device 1030 of the example processing system 1000 of FIG. 11, which is described in greater detail below.

While example manners of implementing the example workload shifter 105 have been illustrated in FIGS. 1-4, one or more of the elements, processes and/or devices illustrated in FIGS. 1-4 may be combined, divided, re-arranged, omitted, eliminated and/or implemented in any other way. Further, the example workload profiler 115, the example workload shifting evaluator 125, the example target demand profiler 130, the example workload configuration reporter 140, the example topology determiner 205, the example resource utilization data collector 210, the example workload profile determiner 215, the example workload profile storage 305, the example target profile storage 310, the example workload constraint storage 315, the example workload assigner 320, the example workload profile aggregator 325, the example shifted workload comparator 330, the example controller 335, the example time-critical workload assigner 405, the example delay-tolerant workload assigner 410, the example stochastic generator 415, the example workload configuration storage 420 and/or, more generally, the example workload shifter 105 may be implemented by hardware, machine readable instructions (including software and/or firmware) and/or any combination of hardware and/or machine readable instructions. Thus, for example, any of the example workload profiler 115, the example workload shifting evaluator 125, the example target demand profiler 130, the example workload configuration reporter 140, the example topology determiner 205, the example resource utilization data collector 210, the example workload profile determiner 215, the example workload profile storage 305, the example target profile storage 310, the example workload constraint storage 315, the example workload assigner 320, the example workload profile aggregator 325, the example shifted workload comparator 330, the example controller 335, the example time-critical workload assigner 405, the example delay-tolerant workload assigner 410, the example stochastic generator 415, the example workload configuration storage 420 and/or, more generally, the example workload shifter 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover an implementation of purely machine readable instructions, at least one of the example workload shifter 105, the example workload profiler 115, the example workload shifting evaluator 125, the example target demand profiler 130, the example workload configuration reporter 140, the example topology determiner 205, the example resource utilization data collector 210, the example workload profile determiner 215, the example workload profile storage 305, the example target profile storage 310, the example workload constraint storage 315, the example workload assigner 320, the example workload profile aggregator 325, the example shifted workload comparator 330, the example controller 335, the example time-critical workload assigner 405, the example delay-tolerant workload assigner 410, the example stochastic generator 415 and/or the example workload configuration storage 420 are hereby expressly defined to include a tangible computer readable medium such as a memory, digital versatile disk (DVD), compact disk (CD), etc., storing such machine readable instructions (e.g., software and/or firmware). Further still, the example workload shifter 105 may include one or more elements, processes and/or devices in addition to, or instead of, those illustrated in FIGS. 1-4, and/or may include more than one of any or all of the illustrated elements, processes and devices.

Flowcharts representative of example machine readable instructions that may be executed to implement the example workload shifter 105, the example workload profiler 115, the example workload shifting evaluator 125, the example target demand profiler 130, the example workload configuration reporter 140, the example topology determiner 205, the example resource utilization data collector 210, the example workload profile determiner 215, the example workload profile storage 305, the example target profile storage 310, the example workload constraint storage 315, the example workload assigner 320, the example workload profile aggregator 325, the example shifted workload comparator 330, the example controller 335, the example time-critical workload assigner 405, the example delay-tolerant workload assigner 410, the example stochastic generator 415 and/or the example workload configuration storage 420 are shown in FIGS. 5-8. In these examples, the machine readable instructions represented by each flowchart may comprise one or more programs for execution by a processor, such as the processor 1012 shown in the example processing system 1000 discussed below in connection with FIG. 11. Alternatively, the entire program or programs and/or portions thereof implementing one or more of the processes represented by the flowcharts of FIGS. 5-8 could be executed by a device other than the processor 1012 (e.g., such as a controller and/or any other suitable device) and/or embodied in machine readable instructions (such as firmware) or dedicated hardware (e.g., implemented by an ASIC, a PLD, an FPLD, discrete logic, etc.). Also, one or more of the machine readable instructions represented by the flowchart of FIGS. 5-8 may be implemented manually. Further, although the example machine readable instructions are described with reference to the flowcharts illustrated in FIGS. 5-8, many other techniques for implementing the example methods and apparatus described herein may alternatively be used. For example, with reference to the flowcharts illustrated in FIGS. 5-8, the order of execution of the blocks may be changed, and/or some of the blocks described may be changed, eliminated, combined and/or subdivided into multiple blocks.

As mentioned above, FIGS. 5-8 illustrate example processes that may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-8 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 5:
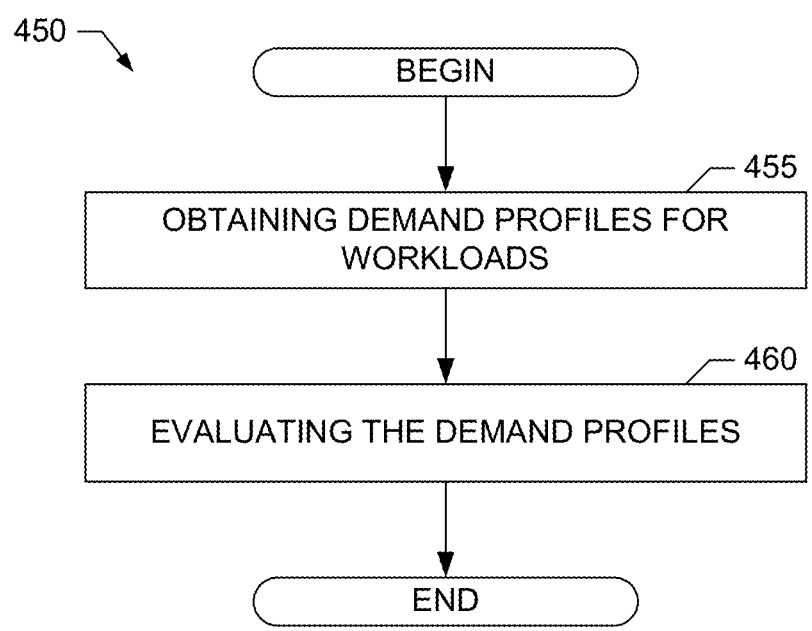
FIG. 5 is a flowchart representative of first example machine readable instructions that may be executed to implement the example workload shifter of FIG. 1.

First example machine readable instructions 450 that may be executed to implement the workload shifter 105 are represented by the flowchart shown in FIG. 5. With reference to the preceding figures, the machine readable instructions 450 of FIG. 5 begin execution at block 455 at which the workload shifter 105 obtains demand profiles for workloads in an IT infrastructure (such as the IT infrastructure 110). In some examples, each demand profile represents resource utilization over time to support a respective workload.

Next, at block 460 the workload shifter 105 evaluates the demand profiles to shift, in time, assignment of at least one of the workloads to resources of the IT infrastructure. In some examples, the processing at block 460 is based on a target demand profile for an aggregation of the workloads.

Figure 6:
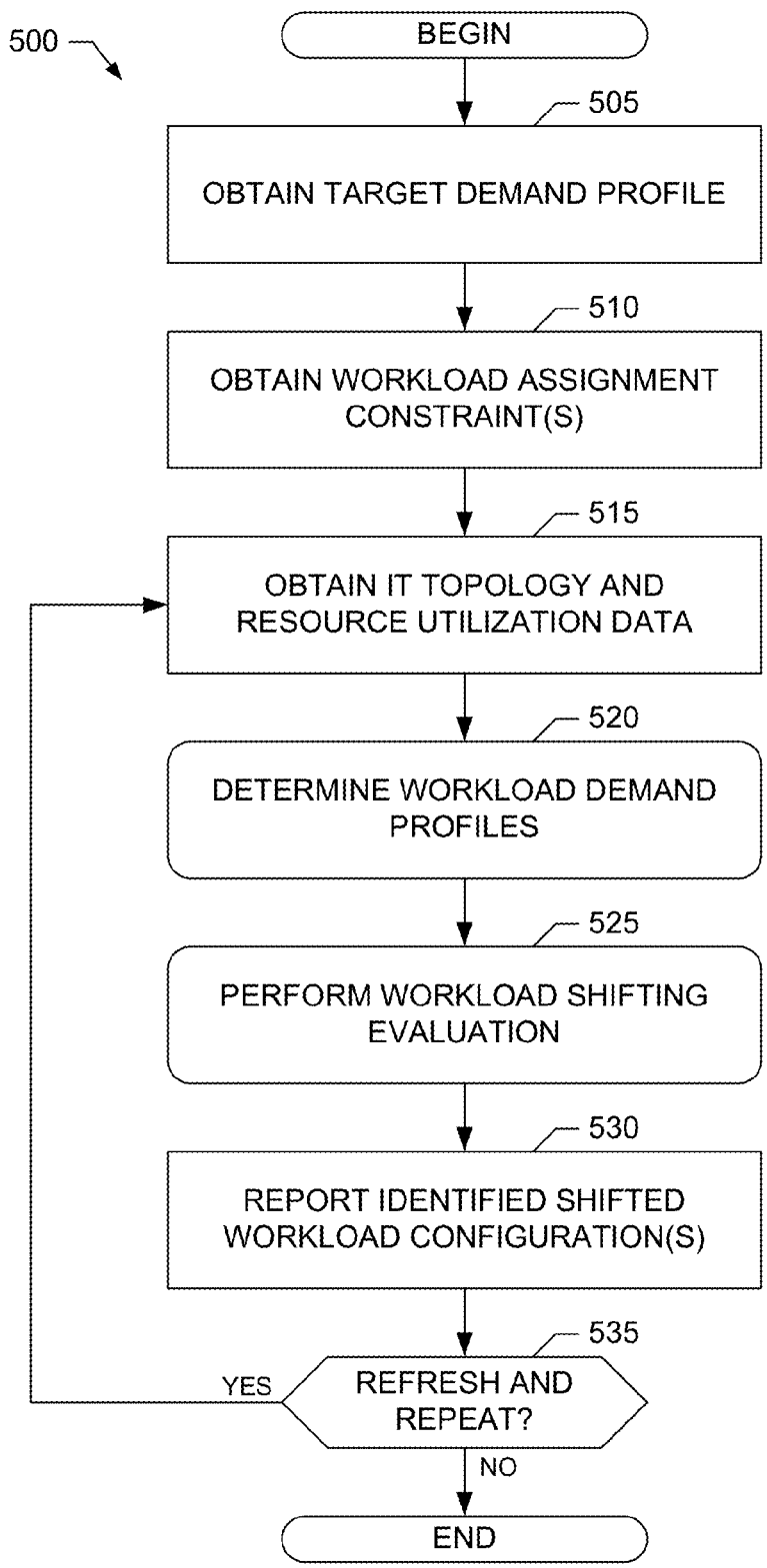
FIG. 6 is a flowchart representative of second example machine readable instructions that may be executed to implement the example workload shifter of FIG. 1.

Second example machine readable instructions 500 that may be executed to implement the workload shifter 105 are represented by the flowchart shown in FIG. 6. With reference to the preceding figures, the machine readable instructions 500 of FIG. 6 begin execution at block 505 at which the target demand profiler 130 of the workload shifter 105 obtains a target demand profile for an aggregation of the workloads associated with applications to be supported (e.g., to be executed or provided) by the IT infrastructure 110. The target demand profile can correspond to all or a particular subset of the applications to be supported by the IT infrastructure 110. As described above, the target demand profile can be provided by a user (e.g., IT administrator) via the terminal 135, by an IT management tool, etc. The target demand profile is stored in the target profile storage 310.

At block 510, the workload shifter 105 obtains one or more workload assignment constraints (e.g., such as workload ordering/sequencing constraints, mission critical rankings of the workloads, etc.) governing assignment of the application workloads to the IT infrastructure 110. In some examples, the workload assignment constraint(s) are used to determine a workload prioritization for selecting workloads for inclusion in a possible workload assignment configuration. The workload assignment constraint(s) is(are) stored in the workload constraints storage 315.

At block 515, the workload profiler 115 of the workload shifter 105 obtains IT topology and resource utilization data by, for example, polling or otherwise querying the IT infrastructure 110. For example, the topology determiner 205 of the workload profiler 115 can obtain IT topology information describing the resources of the IT infrastructure 110, as described above. The resource utilization data representing, for example, the resources of the IT infrastructure 110 (or one or more other IT infrastructures) currently being used (or expected to be used) at different sample times to support each application workload, can be obtained, as described above, by the resource utilization data collector 210 of the workload profiler 115.

At block 520, the workload profiler 115 uses the IT topology and resource utilization data obtained at block 515 to determine individual demand profiles for the application workloads to be supported by the IT infrastructure 110. Example machine readable instructions that may be used to perform the processing at block 520 are illustrated in FIG. 7, which is described in greater detail below.

Figure 8:
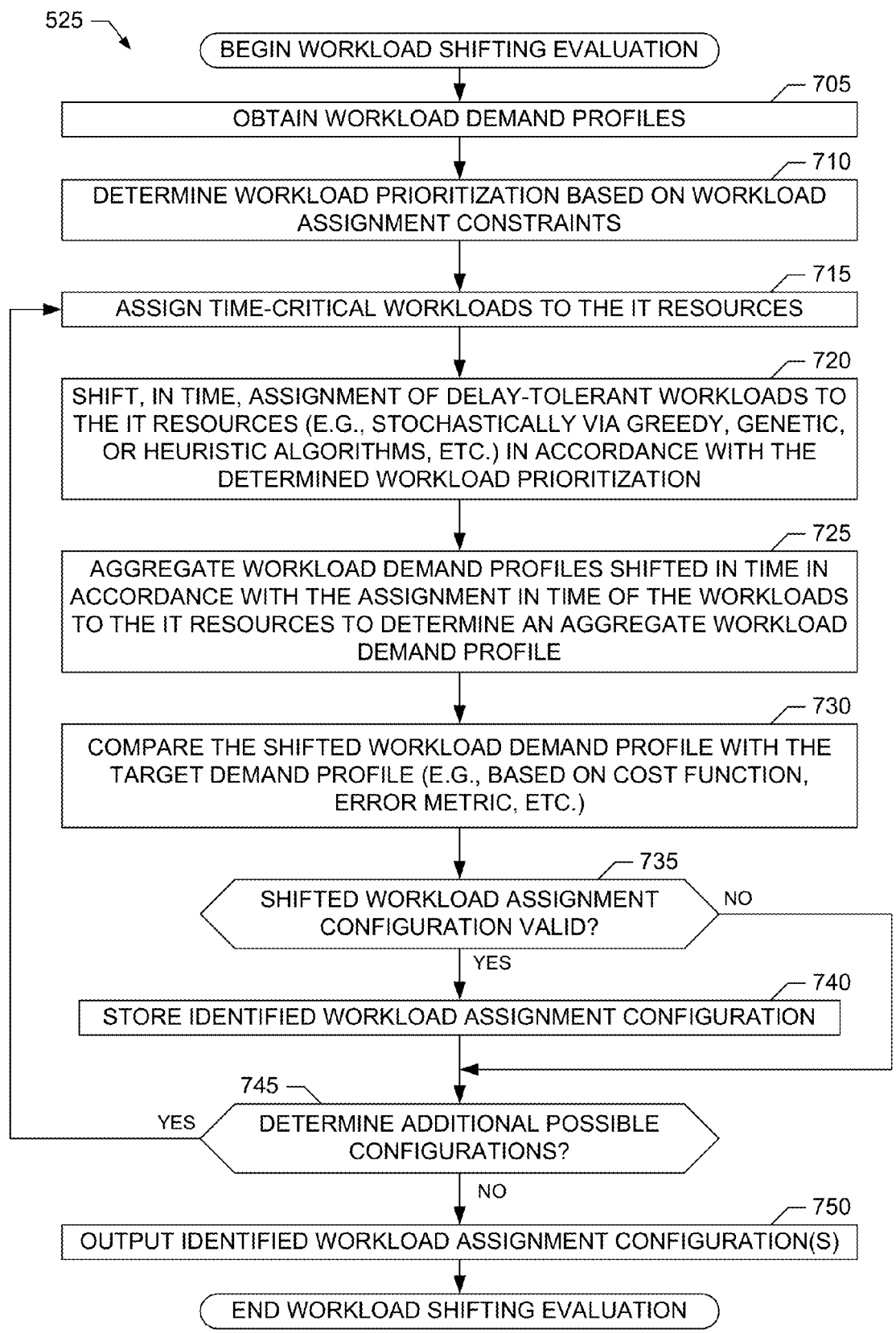
FIG. 8 is a flowchart representative of example machine readable instructions that may be executed to implement the example workload shifting evaluator of FIG. 3 and/or the example workload assigner of FIG. 4, and/or used to implement the example machine readable instructions of FIG. 6.

At block 525, the workload shifting evaluator 125 of the workload shifter 105 evaluates the individual workload demand profiles determined at block 520 to determine one or more possible workload assignment configurations for assigning the application workloads to the IT infrastructure 110. As described above, a possible workload assignment configuration involves shifting, in time, assignment of one or more of the application workloads to resources of the IT infrastructure 110 based on the target demand profile obtained at block 505. Example machine readable instructions that may be used to perform the processing at block 525 are illustrated in FIG. 8, which is described in greater detail below.

At block 530, the workload configuration reporter 140 of the workload shifter 105 reports the possible workload assignment configuration(s) identified at block 525, as described above. At block 535, the workload shifter 105 determines whether processing should be refreshed and repeated (e.g., based on updated IT topology and/or resource utilization data to be obtained from the IT infrastructure 110). If processing is to be repeated (block 535), control returns to block 515 and blocks subsequent thereto. Otherwise, execution of the example machine readable instructions 500 ends.

Figure 7:
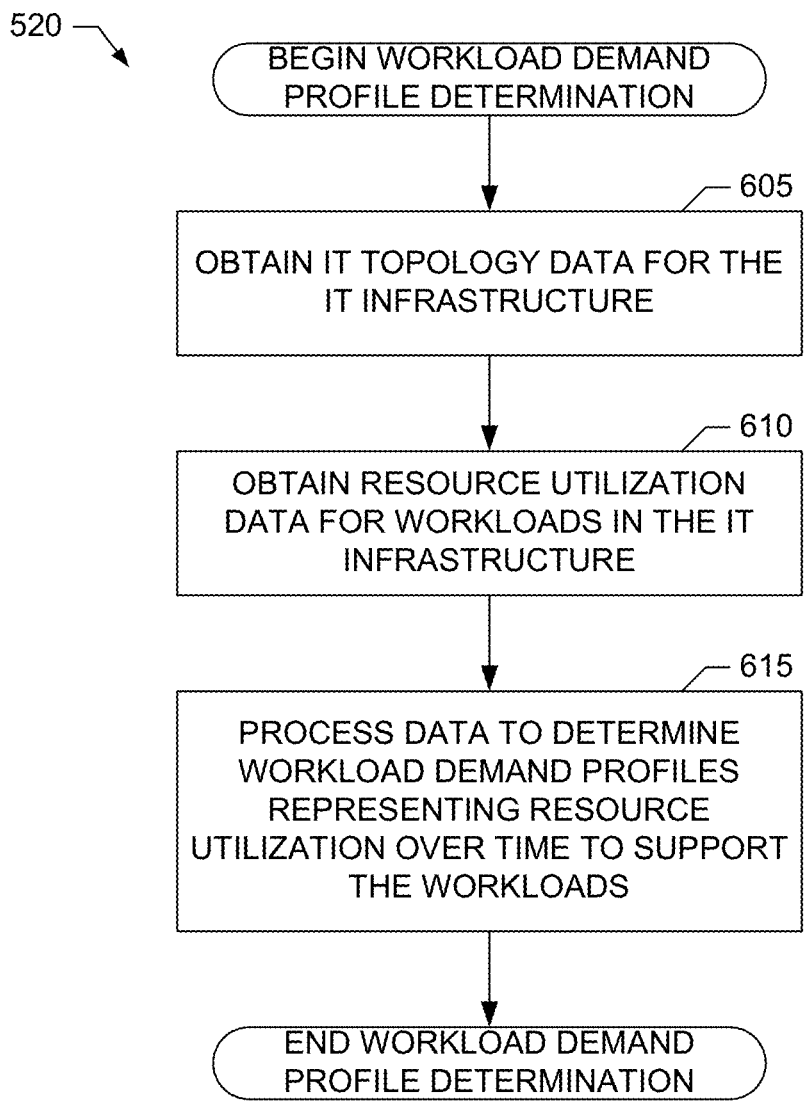
FIG. 7 is a flowchart representative of example machine readable instructions that may be executed to implement the example workload profiler of FIG. 2 and/or used to implement the example machine readable instructions of FIG. 6.

Example machine readable instructions 520 that may be executed to implement the workload profiler 115 and/or used to perform the processing at block 520 of FIG. 6 are represented by the flowchart shown in FIG. 7. With reference to the preceding figures, the machine readable instructions 520 of FIG. 7 begin execution at block 605 at which the topology determiner 205 of the workload profiler 115 obtains IT topology data describing the IT infrastructure 110, as described above. At block 610, the resource utilization data collector 210 of the workload profiler 115 obtains resource utilization data for the application workloads to be supported by the IT infrastructure 110. For example, the resource utilization data collector 210 to or otherwise query the appropriate resources of the IT infrastructure 110 (or one or more other IT infrastructures) to the obtain resource utilization data, as described above. Additionally or alternatively, the resource utilization data collector 210 can use any appropriate simulation technique to estimate or otherwise determine the resource utilization data for one or more application workloads from available input parameters and/or other data.

Then, at block 615 the workload profile determiner 215 of the workload profiler 115 processes the IT topology and resource utilization data to determine individual workload demand profiles for some or all of application workloads to be supported by the IT infrastructure 110. As described above, an individual workload demand profile represents resource utilization over time to support a respective workload. In some examples, at block 615 the workload profile determiner 215 aggregates the resource utilization data over time along one or more specified metrics characterizing one or more types of resources to determine an individual workload demand profile for a particular application workload. As noted above, examples of such metrics include, but are not limited to, power consumption, server usage, memory usage, network bandwidth usage, etc. In some examples, if resource utilization data for a particular application workload is unavailable, the workload profile determiner 215 may use a default profile for the workload or estimate the profile from resource utilization data obtained for other (e.g., similar) application(s). After processing at block 615 completes, execution of the example machine readable instructions 615 ends.

Example machine readable instructions 525 that may be executed to implement the workload shifting evaluator 125 and/or used to perform the processing at block 525 of FIG. 6 are represented by the flowchart shown in FIG. 8. With reference to the preceding figures, the machine readable instructions 525 of FIG. 8 begin execution at block 705 at which workload assigner 320 of the workload shifting evaluator 125 retrieves the individual workload demand profiles from workload profile storage 305. At block 710, the workload assigner 320 determines, as described above, a workload prioritization based on the workload assignment constraint(s), if any, stored in the workload constraint storage 315.

Next, at block 715 the workload assigner 320 assigns time-critical application workloads to resources of the IT infrastructure 110 to determine a possible workload assignment configuration. For example, at block 715 the time-critical workload assigner 405 of the workload assigner 320 assigns, using the workload prioritization determined at block 710, time-critical applications to particular execution times (and possibly particular resource(s) based on obtained IT topology data) in a possible workload assignment configuration, as described above.

At block 720, the workload assigner 320 assigns delay-tolerant workloads to resources of the IT infrastructure 110 to further determine the possible workload assignment configuration. For example, at block 720 the delay-tolerant workload assigner 410 of the workload assigner 320 uses a stochastic process (and associated algorithm) (e.g., such any appropriate greedy, genetic or heuristic algorithm), in combination with the workload prioritization determined at block 710, to select the delay tolerant workloads for inclusion in the possible workload assignment configuration. Additionally, the delay-tolerant workload assigner 410 can shift, in time, assignment of one or more of the delay tolerant workloads in the possible workload assignment configuration, as described above. Furthermore, different delay-tolerant workloads can be subjected to different shifts, in time, as appropriate.

At block 725, the workload profile aggregator 325 of the of the workload shifting evaluator 125 aggregates the individual workload demand profiles obtained at block 705 in accordance with how the application workloads have been shifted, if at all, in the possible workload assignment configuration determined via processing at blocks 715 and 720. For example, the workload profile aggregator 325 can determine an aggregate workload demand profile for the application workloads as assigned in the possible workload assignment configuration by shifting the individual workload demand profiles by amounts corresponding to the amounts by which the application workloads have been shifted in time. The workload profile aggregator 325 can then sum or otherwise combine the individual workload demand profiles, after appropriate shifting, to determine the aggregate workload demand profile for the possible workload assignment configuration.

At block 730, the shifted workload comparator 330 of the workload shifting evaluator 125 compares the aggregate workload demand profile determined at block 725 with a target demand profile (e.g., obtained at block 505 of FIG. 6). For example, the shifted workload comparator 330 can evaluate any type of cost metric, distance metric, error metric, etc., to compare the aggregate workload demand profile with the target demand profile. At block 735, the shifted workload comparator 330 determines whether the possible workload assignment configuration (e.g., containing shifted workload assignments) is valid by, for example, comparing the metric determined at block 730 to a threshold. If the possible workload assignment configuration is valid or otherwise determined to sufficiently satisfy the target demand profile (block 735), then at block 740 the possible workload assignment configuration is stored (or kept rather than deleted) in the workload configuration storage 420 of the workload assigner 320.

At block 745, the controller 335 of the workload shifting evaluator 125 determines whether additional workload assignment configurations are to be determined. For example, the delay-tolerant workload assigner 410 of the workload assigner 320 can employ a stochastic algorithm that may determine a different workload assignment configuration for the same workload constraint(s) and individual workload profiles during subsequent invocations of the delay-tolerant workload assigner 410. In such examples, the processing of FIG. 8 can be repeated a number of times (which may be specified, pre-configured, etc.) to, for example, determine as set of possible workload assignment configurations for consideration by a user, and/or attempt to determine a valid workload assignment configuration after previous attempts have not yielded valid configurations, etc. If additional workload assignment configurations are to be determined (block 745), processing returns to block 715 and blocks subsequent thereto to determine another possible workload assignment configuration. Alternatively, if additional workload assignment configurations are to be determined (block 745), the time-critical application assignments made at block 715 could be retained (e.g., cached), and processing could return to block 720 and blocks subsequent thereto to determine different assignments (e.g., shifts) of the delay-tolerant workloads. However, if additional workload assignment configurations are not to be determined (block 745), at block 750 the workload shifting evaluator 125 outputs the identified (e.g., valid) workload assignment configurations to, for example, the workload configuration reporter 140 of the workload shifter 105. Execution of the example machine readable instructions 525 then ends.

Figure 9:
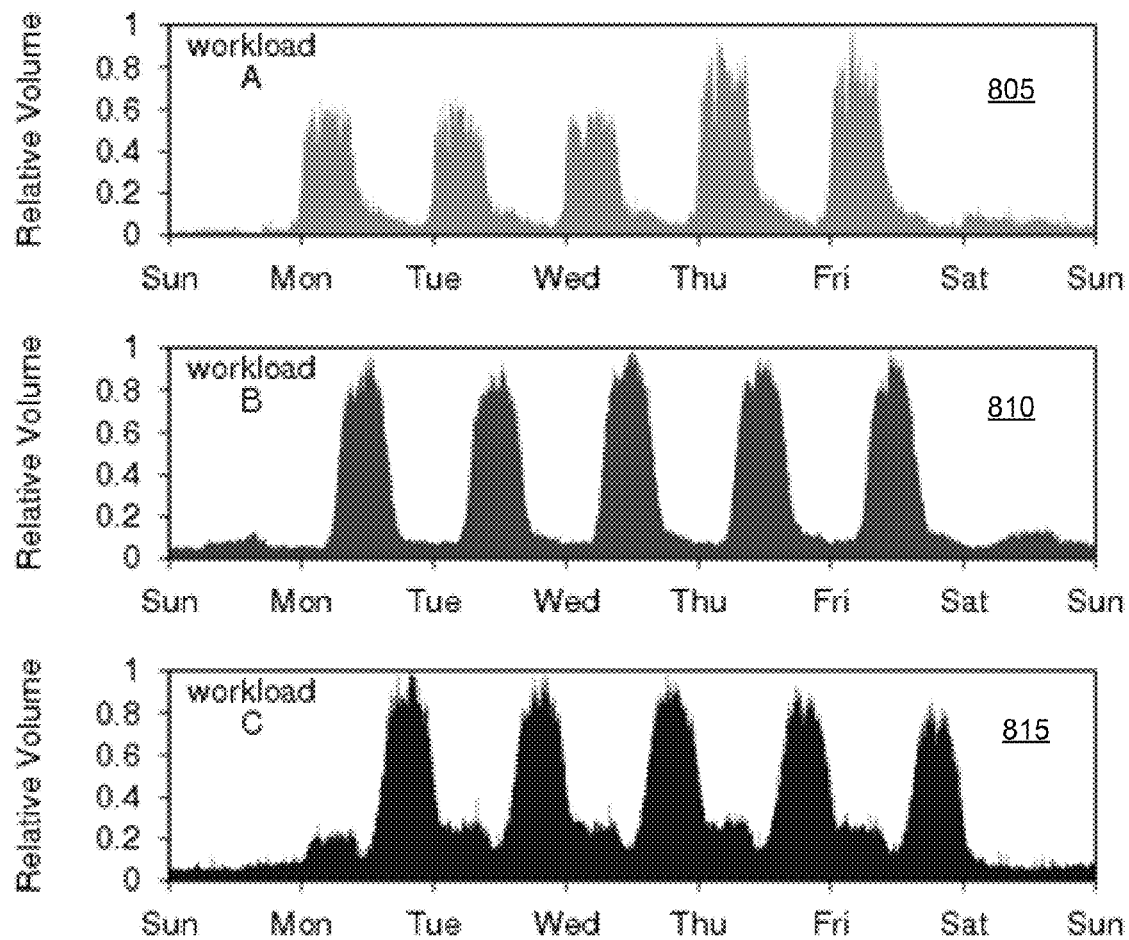
FIG. 9 illustrates example workload demand profiles.
Figure 10A:
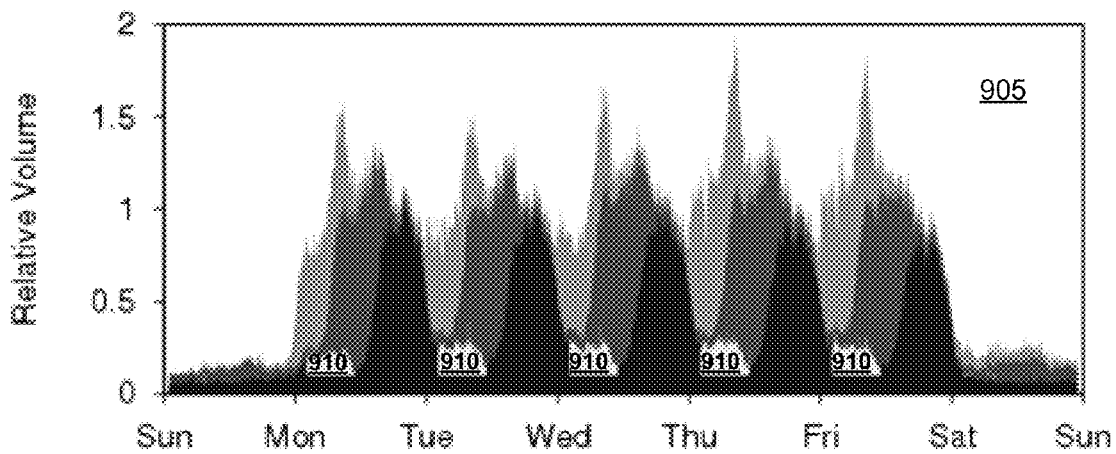
FIGS. 10A-B illustrate example aggregate workload demand profiles determined by the example workload shifter of FIG. 1 for the example workload demand profiles of FIG. 9.
Figure 10B:
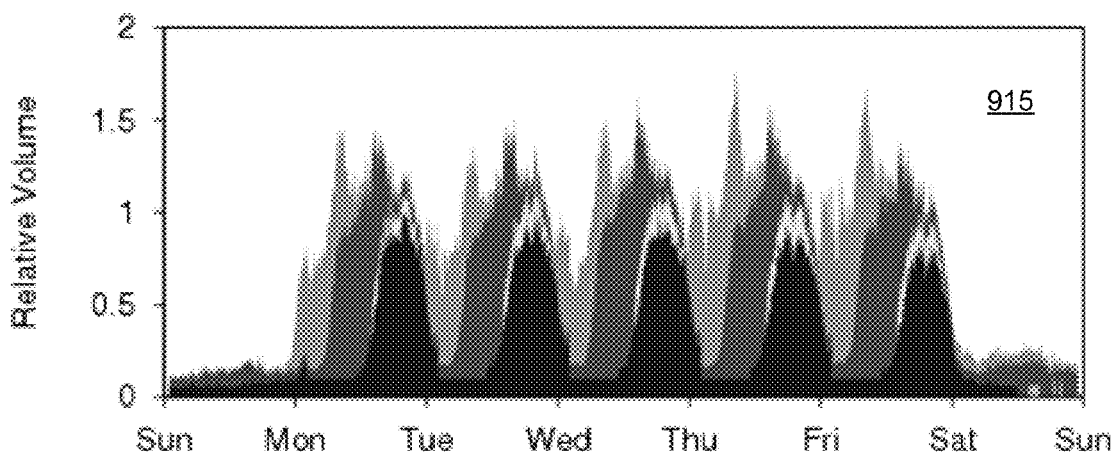

FIGS. 9 and 10A-B illustrate example operation of the workload shifter 105 to determine possible workload assignment configurations involving shifting one or more IT workloads. FIG. 9 illustrates three example workload demand profiles 805, 810 and 815 corresponding to three predominantly interactive workloads. The individual workload demand profiles 805, 810 and 815 were determined using data gathered from servers of an IT infrastructure (e.g., such as the IT infrastructure 110) located in three different time zones. In the illustrated example, the workload demand profile 805 corresponds to a coordinated universal time (UTC) of UTC+9 (e.g., corresponding to Japan). The workload demand profile 810 corresponds to UTC+1 (e.g., corresponding to the United Kingdom). The workload demand profile 815 corresponds to UTC−7 (e.g., corresponding to California). For simplicity, the workload demand profiles 805, 810 and 815 have been normalized such that each workload demand profile has a relative volume with a peak of 1.0.

Several observations can be made concerning the workload demand profiles 805, 810 and 815 of FIG. 9. For example, each workload has a similar demand profile with daily peaks during workdays, and low utilization during evenings and weekends. Also, the peaks across the workloads demand profiles do not align, but instead are shifted due to the offsets between the time zones in which the resource utilization data was collected.

As an illustrative example, consider a scenario in which an organization wishes to consolidate the application workloads corresponding to the workload demand profiles 805, 810 and 815 at an IT infrastructure 110 located at a single location. Because the organization's employees are located in three time zones, each eight hours from the next (e.g., UTC+9. UTC+1 and UTC−7), the organization hopes to achieve significant cost savings and reduced emissions as a result of this consolidation.

Using the workload shifter 105, an IT administrator for the organization determines that simply aggregating the workloads associated with the three different geographical regions, without shifting any of the workloads, provides the example aggregate workload demand profile 905 illustrated in FIG. 10A. The IT administrator further determines that the aggregation represented by FIG. 10A could yield savings in terms of capital and operational savings, as well as reductions in the embedded and operational energy (useful energy) consumed. For example, the aggregate workload demand profile 905 of FIG. 10A reveals that, instead of configuring the IT infrastructure 110 to support a relative volume of 3.0 (e.g., which corresponds to an accumulation of the original resources associated with the three separate IT infrastructures that supported each of the workload demand profiles 805, 810 and 815 independently), the organization could get by with an IT infrastructure 110 that supports a maximum volume of 1.934 (e.g., which is 64.5% of the resources originally associated with the three separate IT infrastructures). Further, the IT administrator could determine that the peaks in the aggregate workload demand profile 905 are relatively short-lived. As a non-limiting example, in the aggregate workload demand profile 905, only 2.8% of the one minute intervals during the week have a relative volume greater than 1.5. Thus, in this non-limiting example, the IT administrator could determine that only 50% of the original IT infrastructure resources would be sufficient if some Quality of Service (QoS) violations could be tolerated.

Further savings are possible if the workload shifter 105 is permitted to shift workloads in time. For example, consider a scenario in which, while reviewing the aggregate demand profile 905 of FIG. 10A, the IT administrator notices that the largest spikes coincide with the execution of a batch job, illustrated by reference numeral 910, that is part of the workload demand profile 815 of FIG. 9. In other words, the workload demand profile 815 is itself an aggregate demand profile that includes the workload demand profile 910 and demand profiles corresponding to other workloads. In the illustrated example, the organization may have originally scheduled this batch job during off-peak hours of the workload demand profile 815. This may have been a good decision at the time, as it made use of otherwise idle resources. However, in the context of consolidating workloads corresponding to the workload demand profiles 805, 810 and 815, the workload shifter 105 can be used to determine a shift of the workload associated with the workload demand profile 910 that yields further efficiencies (e.g., and which corresponds to a target demand profile representing substantially continuous and constant use of the IT infrastructure resources). For example, using the workload shifter 105, the IT administrator can determine that shifting the workload associated with the workload demand profile 910 to run when the workload demand profile 815 is at its peak in UTC−7 yields an improvement over the example of FIG. 10A. In particular, the example aggregate demand profile 915 of FIG. 10B, which corresponds to an aggregation of the workloads associated with the profiles 805, 810 and 815, but with the workload associated with the workload demand profile 910 being shifted as described above, illustrates a drop in the relative volume to 1.764 (e.g., which is 58.8% of the resources originally associated with the three separate IT infrastructures). Additionally, the peaks of the aggregate demand profile 915 of FIG. 10B are of even shorter duration, with, in a non-limiting example, only 1.3% of the one minute intervals exceeding a relative volume of 1.5. For comparison purposes, in the aggregate demand profile 915, 2.8% of the intervals are above a relative volume of 1.436, which corresponds to 47.7% of the resources originally associated with the three separate IT infrastructures, illustrating the potential for further savings is QoS violations can be tolerated.

Figure 11:
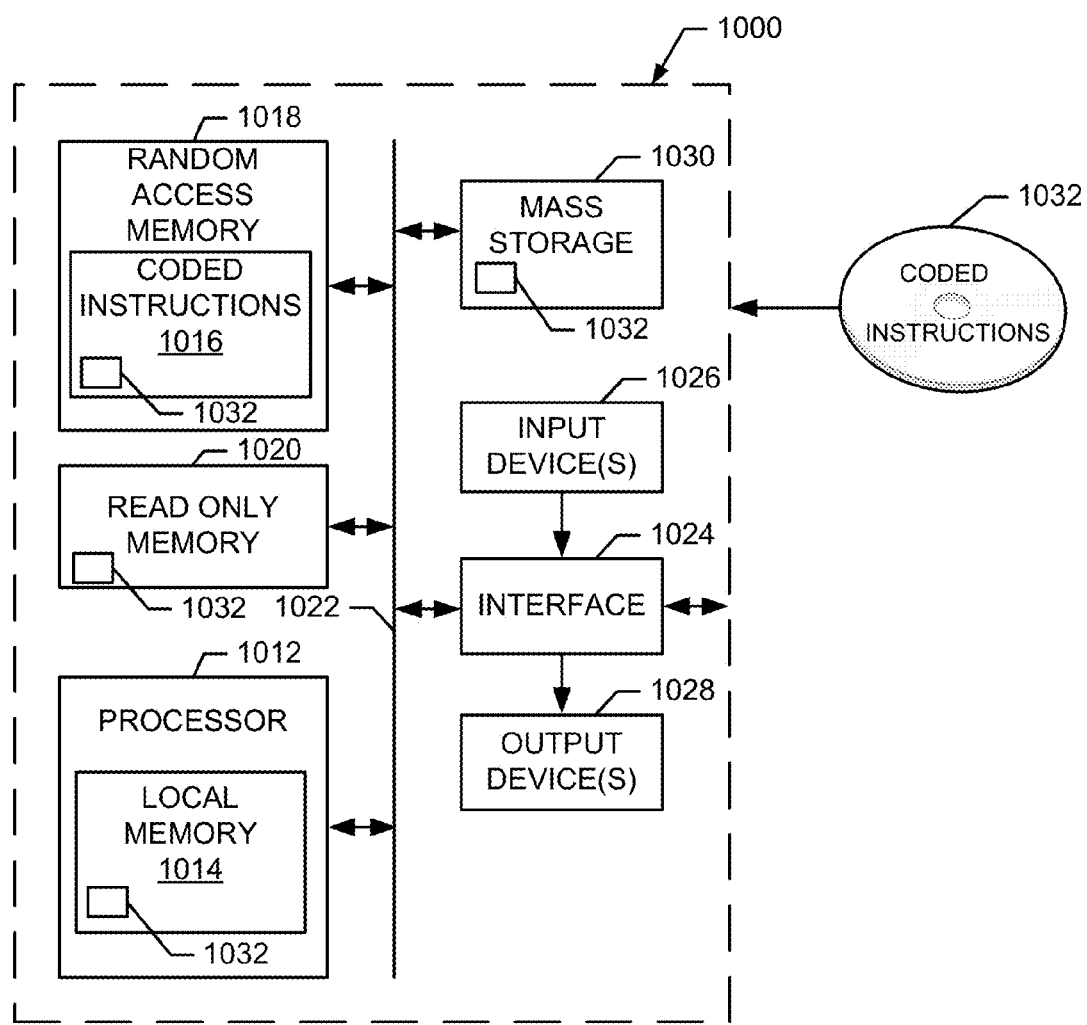
FIG. 11 is a block diagram of an example processing system that may execute the example machine readable instructions of FIGS. 5-7 and/or 8 to implement the example workload shifter of FIG. 1, the example workload profiler of FIG. 2, the example workload shifting evaluator of FIG. 3 and/or the example workload assigner of FIG. 4.

FIG. 11 is a block diagram of an example processing system 1000 capable of implementing the apparatus and methods disclosed herein. The processing system 1000 can be, for example, a server, a personal computer, a personal digital assistant (PDA), an Internet appliance, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 5-8. The processor 1012 may be any type of processing unit, such as one or more microprocessors, one or more microcontrollers, etc. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The processing system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1000 also includes one or more mass storage devices 1030 for storing machine readable instructions and data. Examples of such mass storage devices 1030 include floppy disk drives, hard drive disks, compact disk drives and digital versatile disk (DVD) drives. In some examples, the mass storage device 1030 may implement one or more of the storages 305, 310, 315 and/or 420. Additionally or alternatively, in some examples the volatile memory 1018 may implement one or more of the storages 305, 310, 315 and/or 420.

The coded instructions 1032 of FIGS. 5-8 may be stored in the mass storage device 1030, in the volatile memory 1018, in the non-volatile memory 1020, in the local memory 1014 and/or on a removable storage medium, such as a CD or DVD 1032.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to shift information technology workloads, the method comprising:
    obtaining, using a processor, demand profiles for the workloads in an information technology infrastructure, a respective demand profile representing resource utilization over time to support a respective workload;
    shifting, with the processor, one or more of the demand profiles in time, the one or more of the demand profiles being shifted in time based on different possible assignments of different ones of the workloads to resources of the information technology infrastructure;
    evaluating, with the processor, aggregations of the one or more of the demand profiles shifted in time to determine a plurality of different possible workload assignment configurations that meet a target demand profile for an aggregation of the workloads;
    aggregating the demand profiles shifted in time in accordance with a first one of the different possible workload assignment configurations to determine an aggregate workload demand profile;
    comparing the aggregate workload demand profile and the target demand profile to determine whether to keep the first one of the different possible workload assignment configurations; and
    using a selected one of the plurality of different possible workload assignment configurations to assign the workloads to the resources of the information technology infrastructure.

2. A method as defined in claim 1 further comprising:
    obtaining data representing resource utilization at different times to support the workloads; and
    determining the demand profiles from the data.

3. A method as defined in claim 1 further comprising shifting, in time, assignment of delay-tolerant workloads, but not time-critical workloads, to the resources to determine the different possible assignments of the different ones of workloads to the resources.

4. A method as defined in claim 3 further comprising assigning the time-critical workloads to the resources before assigning the delay-tolerant workloads to the resources.

5. A method as defined in claim 3 further comprising:
    determining a workload prioritization based on workload assignment constraints; and
    shifting assignment of the delay-tolerant workloads to the resources in accordance with the workload prioritization.

6. A method as defined in claim 3 further comprising using a stochastic process to shift, in time, assignment of the delay-tolerant workloads.

7. A method as defined in claim 1 wherein the target demand profile tracks at least one of cost of energy resources to power the information technology infrastructure or availability of renewable energy resources to power the information technology infrastructure.

8. A method as defined in claim 1 wherein the target demand profile corresponds to a reduction in an amount of resources to be employed by the information technology infrastructure caused by increasing a duration during which the resources of the information technology infrastructure are utilized to support the workloads.

9. A tangible machine readable storage medium comprising machine readable instructions which, when executed, cause a machine to at least:
    obtain demand profiles for workloads in an information technology infrastructure, each demand profile representing resource utilization over time to support a respective workload;
    shift one or more of the demand profiles in time, the one or more of the demand profiles being shifted in time based on different possible assignments of different ones of the workloads to resources of the information technology infrastructure;
    evaluate aggregations of the one or more of the demand profiles shifted in time to determine a plurality of different possible workload assignment configurations that meet a target demand profile for an aggregation of the workloads;
    aggregate the demand profiles shifted in time in accordance with a first one of the different possible workload assignment configurations to determine an aggregate workload demand profile;

compare the aggregate workload demand profile and the target demand profile to determine whether to keep the first one of the different possible workload assignment configurations; and use a selected one of the plurality of different possible workload assignment configurations to assign the workloads to the resources of the information technology infrastructure.

10. A tangible storage medium as defined in claim 9 wherein the machine readable instructions, when executed, further cause the machine to:

assign time-critical workloads to the resources without shifting the time-critical workloads in time; and perform a stochastic process to shift, in time, assignment of delay-tolerant workloads to the resources to determine the first one of the different possible workload assignment configurations.

11. A tangible storage medium as defined in claim 10 wherein the machine readable instructions, when executed, further cause the machine to:

perform a second iteration of the stochastic process to determine a different assignment, in time, of the delay-tolerant workloads to the resources to determine a second one of the plurality of different possible workload assignment configurations;

aggregate the demand profiles shifted in time in accordance with the second one of the plurality of different possible workload assignment configurations to determine a second aggregate workload demand profile; and compare the second aggregate workload demand profile and the target demand profile to determine whether the second one of the plurality of different possible workload assignment configurations is valid.

12. A workload shifting apparatus comprising:

a workload profiler to determine demand profiles for workloads in an information technology infrastructure based on data obtained from resources of the information technology infrastructure, each demand profile representing resource utilization over time to support a respective workload;

a target demand profiler to obtain a target demand profile for an aggregation of the workloads; and a workload shifting evaluator comprising a processor to:

shift one or more of the demand profiles in time, the one or more of the demand profiles being shifted in time based on different possible assignments of different ones of the plurality of delay-tolerant workloads to resources of the information technology infrastructure;

evaluate aggregations of the one or more of the demand profiles shifted in time to determine a plurality of different possible workload assignment configurations that meet the target demand profile;

aggregate the demand profiles shifted in time in accordance with a first one of the different possible workload assignment configurations to determine an aggregate workload demand profile;

compare the aggregate workload demand profile and the target demand profile to determine whether to keep the first one of the different possible workload assignment configurations; and use a selected one of the plurality of different possible workload assignment configurations to assign the workloads to the resources of the information technology infrastructure.

13. An apparatus as defined in claim 12 wherein the workload shifting evaluator is to:

determine a workload prioritization based on workload assignment constraints;

assign time-critical workloads to the resources without shifting the time-critical workloads in time; and shift, in time, assignment of the delay-tolerant workloads to resources based on the workload prioritization and a stochastic process.

14. An apparatus as defined in claim 12 wherein the workload profiler is to repeatedly determine updated demand profiles based on updated data received from the resources of the information technology infrastructure, and the workload shifting evaluator is to repeatedly determine corresponding updated workload assignment configurations based on evaluating the updated demand profiles.

* * * * *